US007143422B2

(12) United States Patent
Bae

(10) Patent No.: US 7,143,422 B2
(45) Date of Patent: Nov. 28, 2006

(54) SLIM OPTICAL DISC DRIVE

(75) Inventor: Byoung-young Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 463 days.

(21) Appl. No.: 10/756,389

(22) Filed: Jan. 14, 2004

(65) Prior Publication Data

US 2004/0148614 A1 Jul. 29, 2004

(30) Foreign Application Priority Data

Jan. 27, 2003 (KR) ................ 10-2003-0005195

(51) Int. Cl.
*G11B 17/04* (2006.01)
(52) U.S. Cl. .................................. 720/601
(58) Field of Classification Search ............ None
See application file for complete search history.

(56) References Cited

U.S. PATENT DOCUMENTS

| 5,812,511 A * | 9/1998 | Kawamura et al. ......... 720/616 |
| RE36,511 E * | 1/2000 | Liou et al. ............... 360/99.06 |
| 6,111,838 A * | 8/2000 | Akiba ........................ 720/610 |
| 6,266,312 B1* | 7/2001 | Akiba ........................ 720/610 |
| 6,650,610 B1* | 11/2003 | Kutaragi et al. ............ 720/616 |
| 6,700,850 B1* | 3/2004 | Takahashi et al. .......... 720/601 |
| 6,910,218 B1* | 6/2005 | Park et al. .................. 720/653 |
| 6,922,842 B1* | 7/2005 | Takahashi et al. .......... 720/684 |
| 6,925,647 B1* | 8/2005 | Kabasawa .................... 720/601 |
| 6,954,936 B1* | 10/2005 | Ahn .......................... 720/610 |
| 7,028,317 B1* | 4/2006 | Sakata et al. ............... 720/674 |
| 2003/0086358 A1* | 5/2003 | Park et al. .................. 369/248 |
| 2003/0117928 A1* | 6/2003 | Choi et al. ................. 369/75.2 |
| 2004/0004927 A1* | 1/2004 | Ahn ........................... 369/75.2 |
| 2004/0111732 A1* | 6/2004 | Park et al. .................. 720/650 |
| 2004/0111733 A1* | 6/2004 | Bae ............................ 720/652 |
| 2004/0163094 A1* | 8/2004 | Matsui et al. ............... 720/650 |

FOREIGN PATENT DOCUMENTS

KR 2002-59532 7/2002

* cited by examiner

*Primary Examiner*—Allen Cao
(74) *Attorney, Agent, or Firm*—Staas & Halsey LLP

(57) ABSTRACT

A slim optical disc drive in a portable computer, includes a main body, a tray, and a front panel. The main body includes an upper frame and a lower frame. The tray is installed in the main body to be loaded and/or unloaded and includes a spindle motor to rotate an optical disc and an optical pickup to record information on and/or reproduce information from the optical disc. The front panel is combined with a front side of the tray. A front end of the upper frame is supported by the front panel so that the upper frame is distorted downward by a load.

13 Claims, 8 Drawing Sheets

SLIM OPTICAL DISC DRIVE

CROSS-REFERENCE TO RELATED APPLICATIONS

This application claims the priority of Korean Patent Application No. 2003-5195, filed on Jan. 27, 2003, in the Korean Intellectual Property Office, the disclosure of which is incorporated herein by reference.

BACKGROUND OF THE INVENTION

1. Field of the Invention

The present invention relates to an optical disc drive, and more particularly, to a slim optical disc drive built in a portable device such as a notebook computer and the like.

2. Description of the Related Art

Optical disc drives are generally used to record information on and/or reproduce information from compact discs (CDs) and digital video discs (DVDs). An optical disc drive includes an optical pickup which slides in a radial direction of an optical disc to irradiate a beam onto a recording surface of the optical disc that is rotating, so as to record information on and/or reproduce information from the optical disc. In particular, an optical disc drive is made slim for use in a portable device such as a notebook computer.

FIG. 1 is a perspective view of a conventional slim optical disc drive, and FIG. 2 is a detailed perspective view of the conventional slim optical disc drive of FIG. 1 built in a notebook computer. Referring to FIG. 1, a main body 10 includes a spindle motor 40 which rotates an optical disc D and a tray 30 on which an optical pickup 50 is mounted to access the optical disc D and record information on and/or reproduce information from the optical disc D. The tray 30 slides in a direction indicated by an arrow to be loaded into and/or unloaded from the main body 10. The main body 10 further includes a main control board (not shown), which controls the movement of an optical disc drive, an upper frame 11 and a lower frame 12.

In FIG. 2, a slim optical disc drive 60 is built in a portable computer 70. Portable computers such as notebook computers and the like are being made more compact and lighter. Thus, various attempts to reduce the thickness of optical disc drives have been made.

For example, the upper frame 11 and the lower frame 12 of the main body 10 are made of an iron plate with the thickness of 1.0 mm or less. Also, a gap between the tray 30 and the main body 10 is approximately 1 mm, and a gap between the optical disc D and the upper frame 11 is between 1 and 2 mm.

Since the upper frame 11 and the lower frame 12 each have a thin thickness, the optical disc drive 60 becomes weak. As shown in FIG. 2, when the optical disc drive 60 is inserted into the portable computer 70, the optical disc drive 60 is generally located under a keyboard 71. When the keyboard 71 is pressed down, the keyboard 71 may be slightly deformed by a load F and thus presses down the upper frame 11. As previously described, the upper frame 11 is generally made of a thin iron plate. Thus, the upper frame 11 may be slightly distorted by the load F. In particular, as indicated by dashed lines of FIG. 1, a front end 13 of the upper frame 11 is most seriously bent. This is because edges 14, 15, and 16 of the upper frame 11 are perpendicularly bent down and the front end 13 is open so that the tray 30 slides into and/or out of the main body 10. When a heavy load is applied to the keyboard 71, the upper frame 11 may be distorted to reduce a gap between the optical disc D and the upper frame 11. As a result, the upper frame 11 may touch the optical disc D during the rotation of the optical disc D, and the optical disc D may be seriously damaged.

SUMMARY OF THE INVENTION

Accordingly, it is an aspect of the present invention to provide an improved slim optical disc drive in which a front end of an upper frame can be supported so that the upper frame is not distorted by a load and to prevent damage to an optical disc due to the distortion of the upper frame.

Additional aspects and/or advantages of the invention will be set forth in part in the description which follows and, in part, will be obvious from the description, or may be learned by practice of the invention.

The foregoing and/or other aspects of the present invention are achieved by providing a slim optical disc drive built in a portable computer. The slim optical disc drive comprises a main body, a tray, and a front panel. The main body comprises an upper frame and a lower frame. The tray is installed in the main body to be loaded and/or unloaded and comprises a spindle motor to rotate an optical disc and an optical pickup to record information on and/or reproduce information from the optical disc. The front panel is combined with a front side of the tray. A front end of the upper frame is supported by the front panel, so that the upper frame is distorted downward by load.

At least a portion of the front panel is support by the portable computer so that the load is conveyed to the portable computer.

The front panel comprises a support portion extending toward the front end of the upper frame. The support portion may be located under the front end when the tray is completely loaded into the main body. The upper frame comprises at least one protrusion which extends from the front end of the upper frame toward the front panel, and an insertion portion is formed on the front panel, wherein the at least one protrusion is inserted into the insertion portion of the front panel. The front end of the upper frame may extend toward the front panel, and the front panel may comprise an insertion portion into which the front end is inserted.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
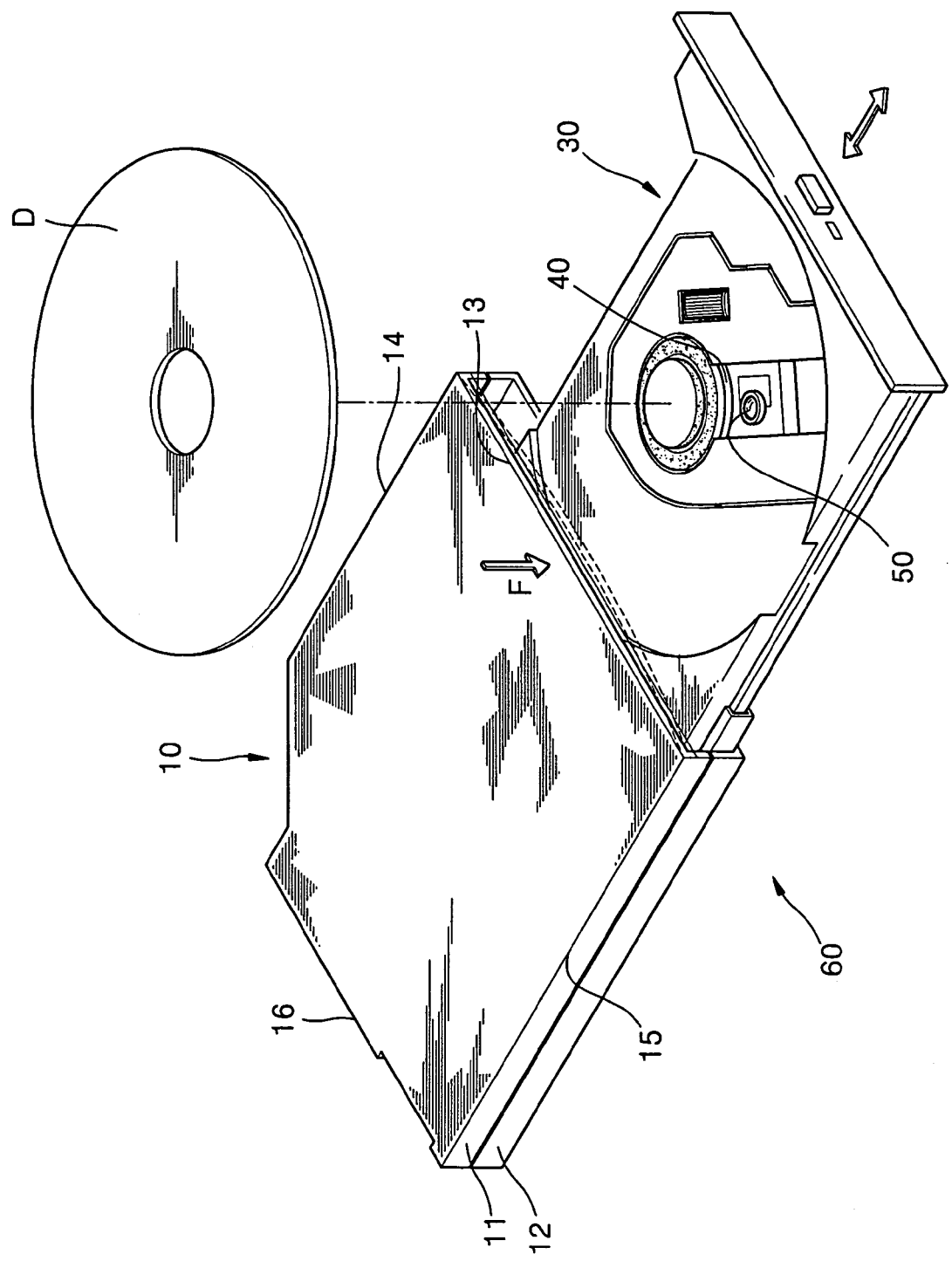
FIG. 1 is a detailed perspective view of a conventional slim optical disc drive.
Figure 2:
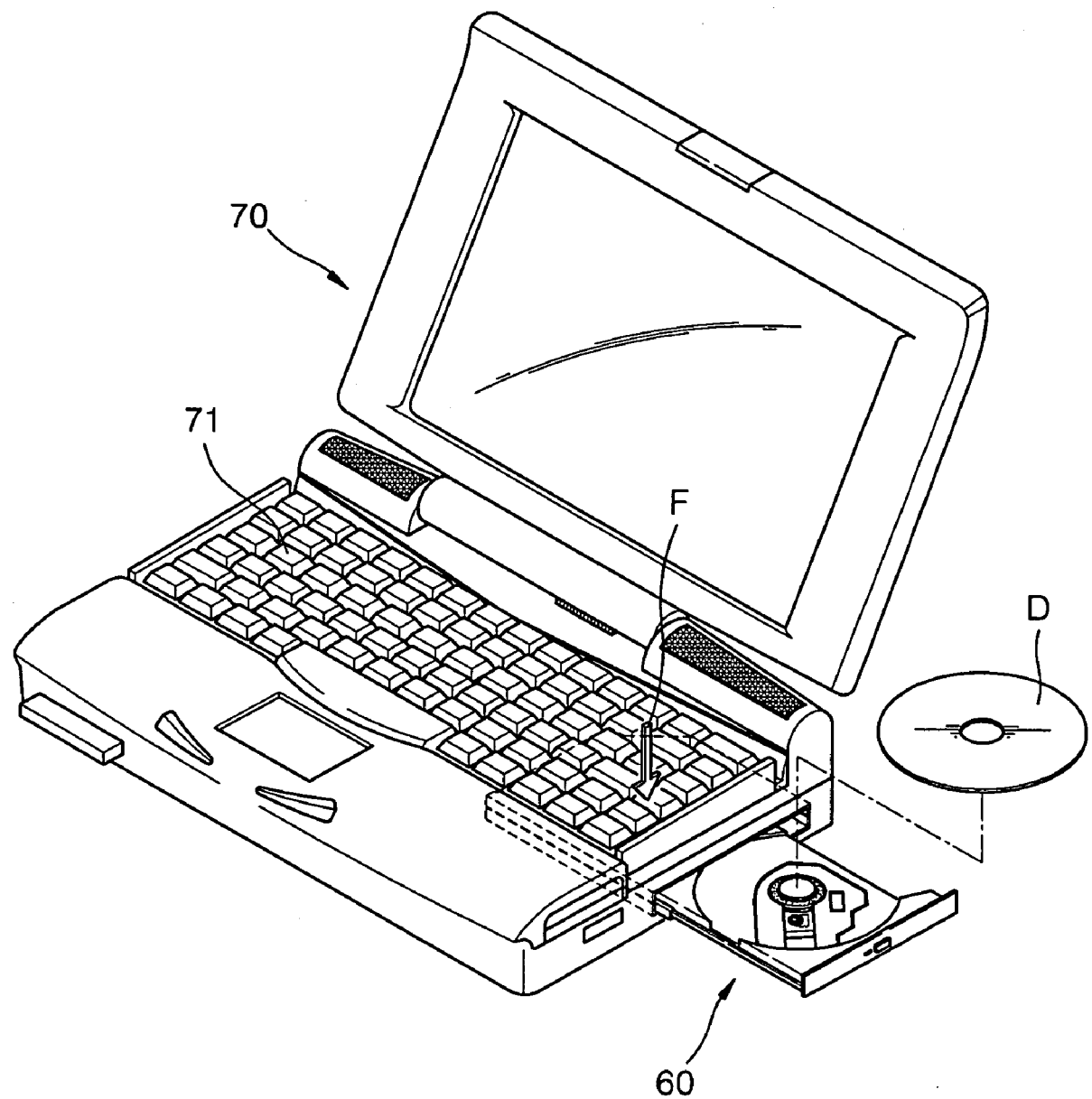
FIG. 2 is a perspective view of the conventional slim optical disc drive of FIG. 1 in a notebook computer.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
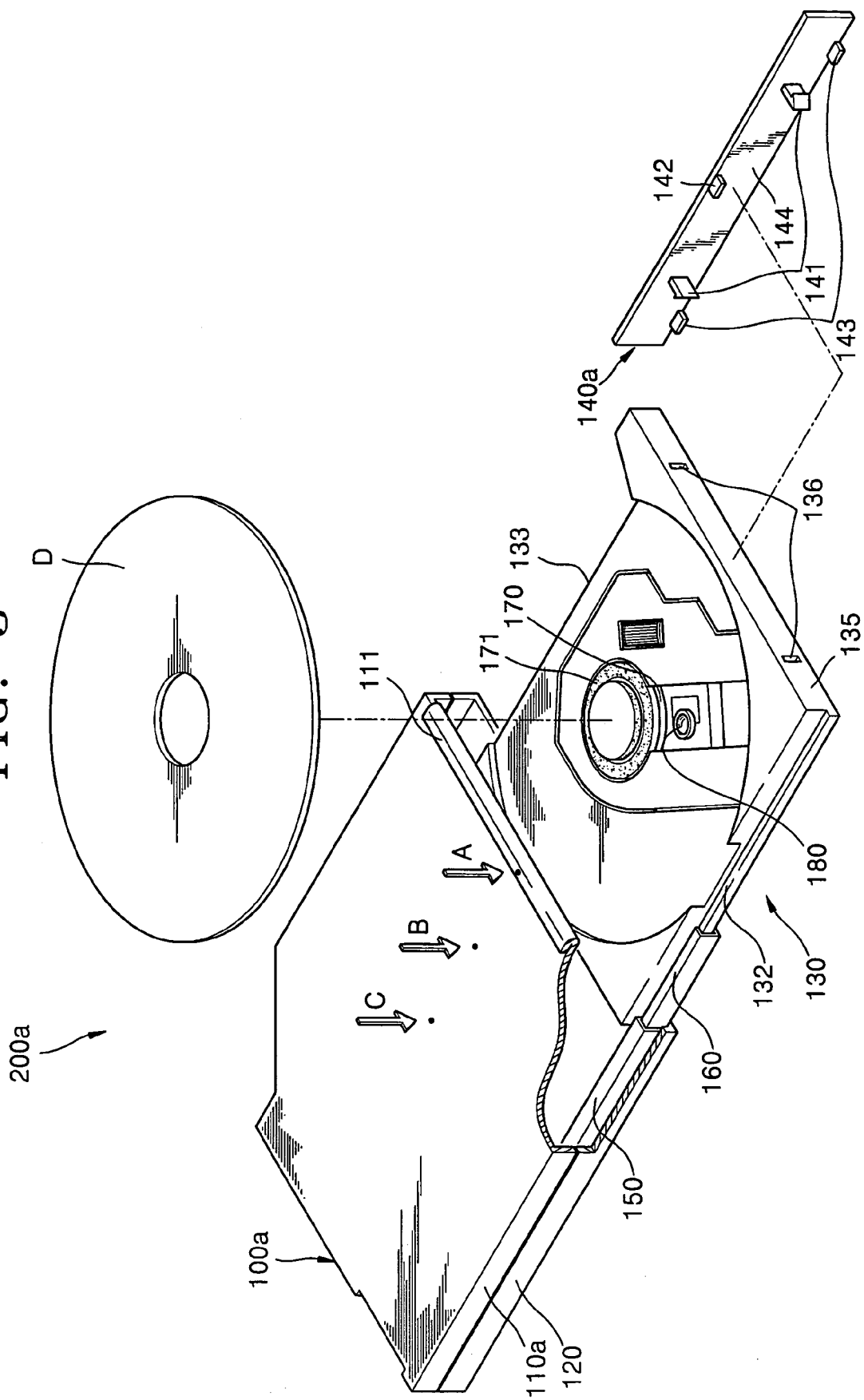
FIG. 3 is an exploded perspective view of a slim optical disc drive according to a first embodiment of the present invention.
Figure 4:
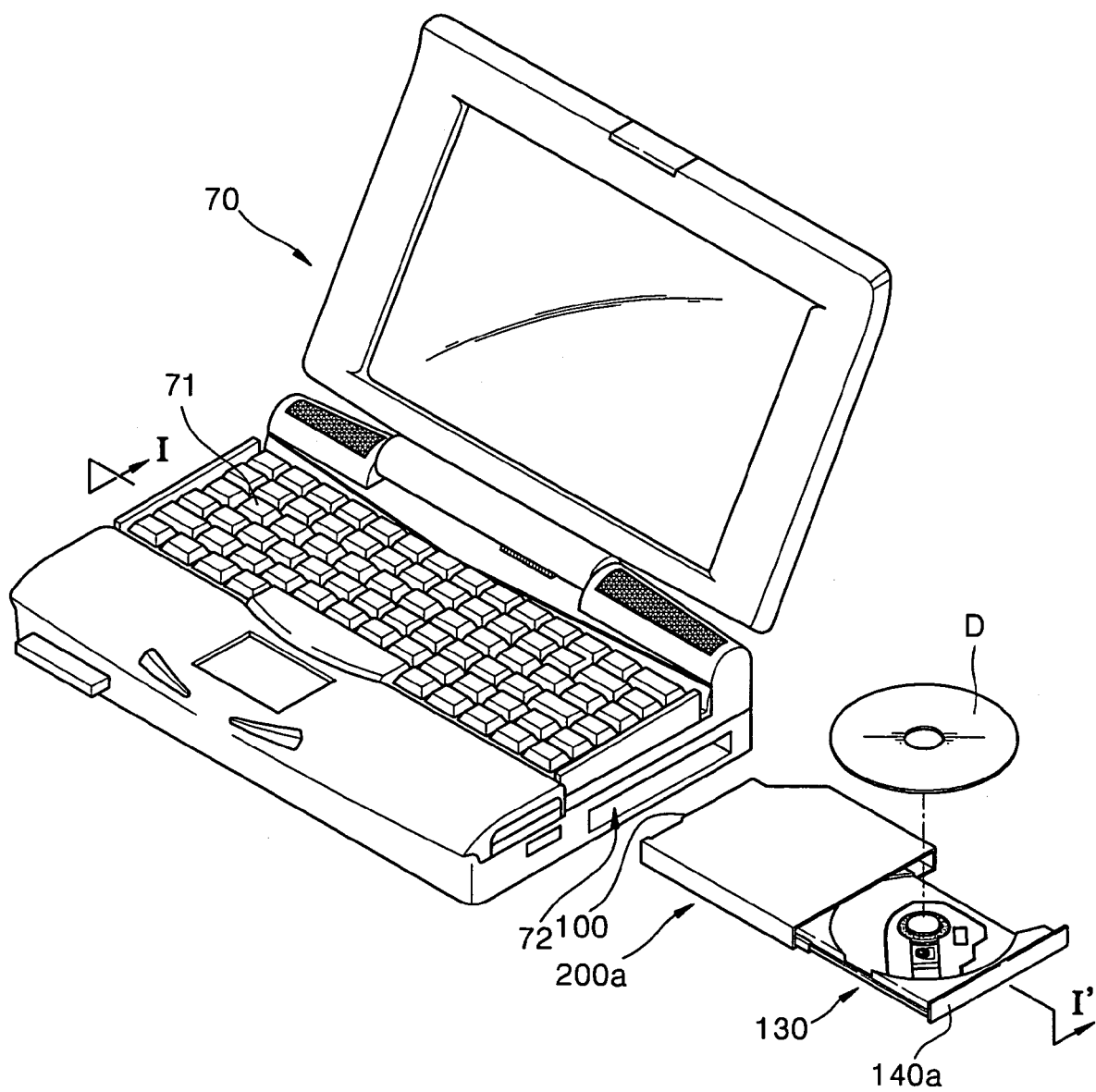
FIG. 4 is an exploded perspective view of the slim optical disc drive of FIG. 3 in a portable computer.
Figure 5:
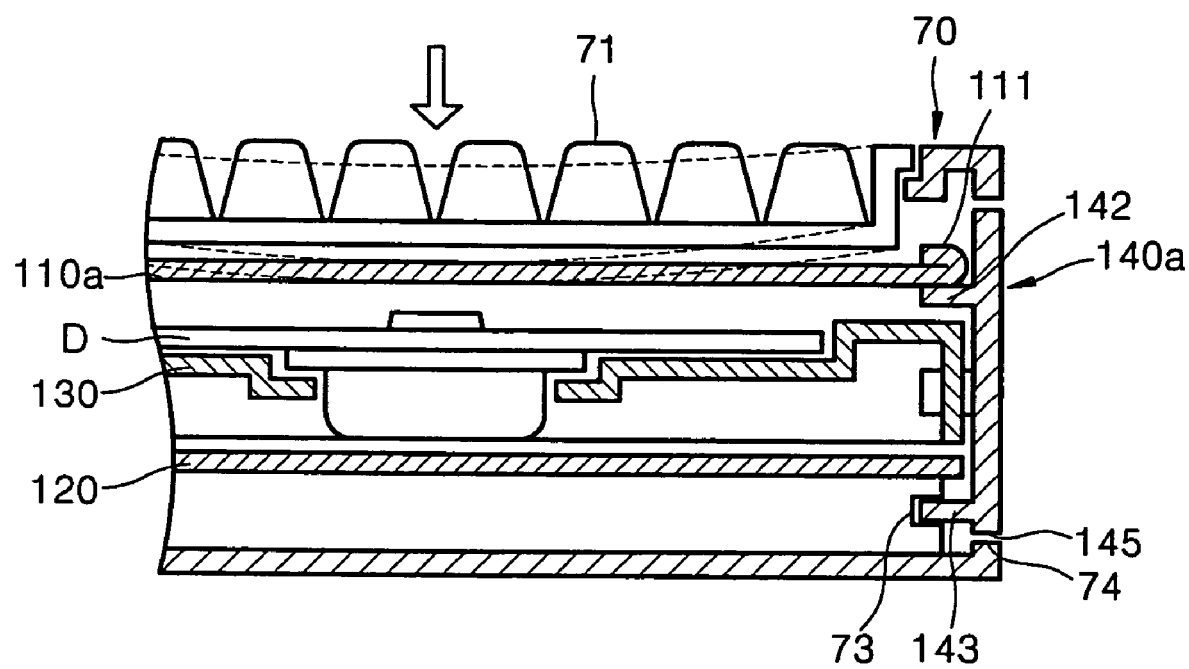
FIG. 5 is a cross-sectional view taken along I–I' of FIG. 4.

FIG. 3 is an exploded perspective view of a slim optical disc drive according to a first embodiment of the present invention, FIG. 4 is an exploded perspective view of the slim optical disc drive of FIG. 3 in a portable computer, and FIG. 5 is a cross-sectional view taken along I–I' of FIG. 4.

In FIG. 3, a main body 100a comprises a lower frame 120 and an upper frame 110a. A tray 130 is installed in the main body 100a to be loaded into and/or unloaded from the main body 100a.

The lower frame 120 and the upper frame 110a may be made of a metal plate such as an iron plate, an aluminum plate, or the like. A slim optical disc drive 200a is made of a light aluminum plate to reduce the weight. As shown in FIGS. 3 and 5, a front end 111 of the upper frame 110a is "U" shaped to eliminate the stress applied to the front end 111 when a load is applied to the keyboard 71. However, the present invention is not limited to this shape.

A "C"-shaped first rail 150 is installed on the lower frame 120. A "C"-shaped second rail 160 is installed inside the first rail 150 to slide in and out of the main body 110a. Both edges 132 and 133 of the tray 130 are inserted into the second rail 160. Accordingly, when the tray 130 is unloaded from the main body 100a, the second rail 160 slides out of the first rail 150, together with the tray 130. While the tray 130 is unloaded from the main body 100a, the second rail 160 is hooked by a stopper (not shown) to stop sliding. Then, the tray 130 continues sliding out of the second rail 160. The tray 130 is loaded into the main body 100a in the reverse order. Alternatively, when loading the tray 130 into the main body 100a, the second rail 160 may first slide into the first rail 150, and then the tray 130 may slide into the second rail 160.

When the tray 130 is loaded into and/or unloaded from the main body 100a, the tray 130 keeps a predetermined gap with the upper frame 110a and the lower frame 120 to avoid contact with the upper frame 110a and the lower frame 120. A spindle motor 170 and an optical pickup 180 are installed in the tray 130. The spindle motor 170 rotates the optical disc D, and a turntable 171 is installed at a shaft of the spindle motor 170. The optical disc D is placed on the turntable 171. The optical pickup 180 is driven by a drive motor (not shown) to slide in a radial direction of the optical disc D to record information on and/or reproduce information from the optical disc D.

A main control board (not shown) is installed in the main body 100a. The main control board controls the overall operation of an optical disc drive 200a and electrically communicates via a flexible printed circuit (FPC) with electronic elements such as the optical pickup 180, the spindle motor 170, and etc. which are installed in the tray 130. Also, the optical disc drive 200a further comprises a locker (not shown) and a pusher (not shown). The locker locks the tray 130 in the main body 100 when the tray 130 is loaded into the main body 100a. The pusher slightly slides the tray 130 in the unloading direction when the tray 130 is unlocked.

A front side 135 of the tray 130 comprises holes 136 to be combined with a front panel 140a. The front panel 140a comprises hooks 141 which are inserted into the holes 136. In the present embodiment, the front panel 140a is combined with the tray 130 by inserting the hooks 141 into the holes 136.

In FIG. 4, the portable computer 70 comprises a slot 72 into which the optical disc drive 200a is inserted. The optical disc drive 200a is inserted into the slot 72 to communicate with the portable computer 70. As a result, the optical disc drive 200a reads information from the optical disc D and transmits the information read to the portable computer 70 or receives information from the portable computer 70 to record the information received on the optical disc D. When the optical disc drive 200a is loaded into the portable computer 70, the front panel 140a becomes a portion of the external shape of the portable computer 70. The front panel 140a is made to correspond to the shape of the mouth of the slot 72 and the external shape and color of the portable computer 70.

The front panel 140a comprises a first support portion 142 which supports the front end 111 of the upper frame 110a. The first support portion 142 extends from a rear surface 144 of the front panel 140a to support the front end 111 when the tray 130 is loaded into the main body 100a. In FIG. 5, the first support portion 142 is located under the front end 111 of the upper frame 110a to prevent the tray 130 from contacting with the front end 111 when loading and/or unloading the tray 130. The end of the first support portion 142 is chamfered or rounded. In the present embodiment, a first support portion 142 is formed at the center of the front panel 140a. However, two or more first support portions 142 may be formed.

The front panel 140a is made so that at least a portion of the front panel 140a is supported by the portable computer 70. Therefore, when the tray 130 is completely loaded into the main body 100a, a portion of a lower surface 145 of the front panel 140a or the entire lower surface 145 may be supported by a lower surface 74 of the mouth of the slot 72. Second support portions 143 may be formed on the front panel 140a. When the optical disc drive 200a is inserted into the portable computer 70 and the tray 130 is loaded into the main body 100a, the second support portions 143 are combined with combiners 73 of the portable computer 70. The second support portions 143 may have a complementary shape with respect to the combiners 73. Thus, the combiners 73 may be dented, whereas the second support portions 143 may protrude from the rear surface 144 to be inserted into the combiners 73. However, the second support portions 143 may be dented while the combiners 73 may protrude to be inserted into the second support portions 143.

The operation of the optical disc drive 200a having the above-described structure will now be explained.

In FIG. 4, the optical disc drive 200a is loaded into the slot 72 of the portable computer 70 to exchange information with the portable computer 70. The tray 130 is unloaded out of the main body 100a, the optical disc D is placed on the tray 130, and the tray 130 is loaded into the main body 100a. The tray 130 then slides into the first rail 150 and the second rail 160. When the tray 130 is completely loaded into the main body 100a, the tray 130 is locked in the main body 100a by the locker.

When the tray 130 is completely loaded into the main body 100a, as shown in FIG. 5, the first support 142 touches the front end 111 of the upper frame 110a and a gap between the first support 142 and the front end 111 is maintained. In FIG. 5, when a heavy shock or load is applied to the portable computer 70, the external shape of the portable computer 70 or the keyboard 71 may be deformed and thus presses down the upper frame 110a. However, in the present embodiment, the first support portion 142 supports the front end 111 so that the upper frame 110a is not easily distorted.

When the front panel 140a comprises the second support portions 143 to be supported by the portable computer 70, the load transmitted to the front panel 140a via the first support portion 142 is conveyed to the portable computer 70. Accordingly, the front end 111 of the upper frame 110a is supported by the portable computer 70. Also, the vibration of the tray 130 is propagated to the portable computer 70 via the second support portions 143. As a result, the optical disc drive 200a has a stable structure.

Table 1 shows the flexure of the upper frame 110a when a load is applied to positions A, B, and C of the upper frame 110a (shown in FIG. 3). The position C corresponds to the central position of the optical disc D when the tray 130 is loaded into the main body 100a, indicates when the front panel 140a comprises the first support portion 142, and Δ indicates when the front panel 140a does not comprise the first support portion 142.

TABLE 1

| | | \multicolumn{7}{c}{Flexure of Upper Frame (mm)} |
|---|---|---|---|---|---|---|---|---|
| | | 0.2 | 0.3 | 0.4 | 0.5 | 0.6 | 0.7 | 0.8 |
| A | Δ | 33.7 | 52.4 | 70 | 85.5 | 99 | 116 | 155 |
| | | 78 | 103 | 152 | 206 | 262 | 320 | 379 |
| B | Δ | 52 | 77 | 97 | 118 | 144.7 | 189.5 | 235.4 |
| | | 72.3 | 97 | 134.4 | 175 | 219 | 263.1 | 310.3 |
| C | Δ | 63 | 85 | 110 | 140.5 | 178 | 219 | 263 |
| | | 72 | 96 | 129 | 166 | 205 | 245 | 286 |
| | | \multicolumn{7}{c}{Load on Upper Frame (gf)} |

As can be seen in Table 1, when the front panel 140a comprises the first support portion 142, the position A stands double load compared to when the front panel 140a does not comprise the first support portion 142. The positions B and C also stand a heavier load compared to the case where the front panel 140a does not comprise the first support portion 142.

In the present embodiment, the front panel 140a is located near to the front side 135 of the tray 130. Thus, the first support portion 142 may extend toward the front end 111 to support the front end 111. When the optical disc drive 200a is inserted into the portable computer 70, the front side 135 of the tray 130 may be distant from the mouth of the slot 72. As described above, when the front panel 140a is made corresponding to the external shape of the portable computer 70, the first support portion 142 may be excessively long. Therefore, an optical disc drive may be manufactured as shown in FIGS. 6–8.

Figure 6:
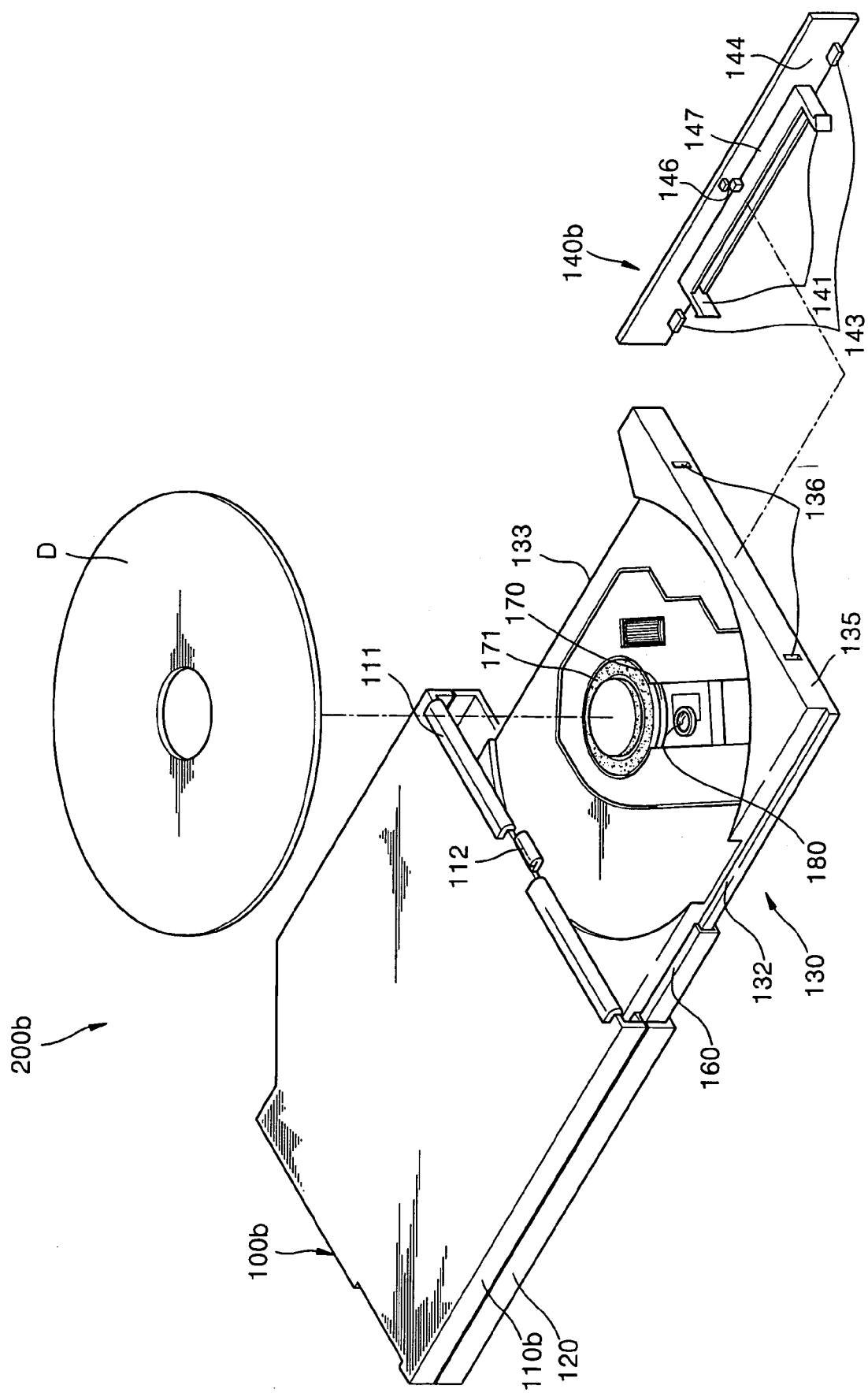
FIG. 6 is an exploded perspective view of a slim optical disc drive according to a second embodiment of the present invention.
Figure 7:
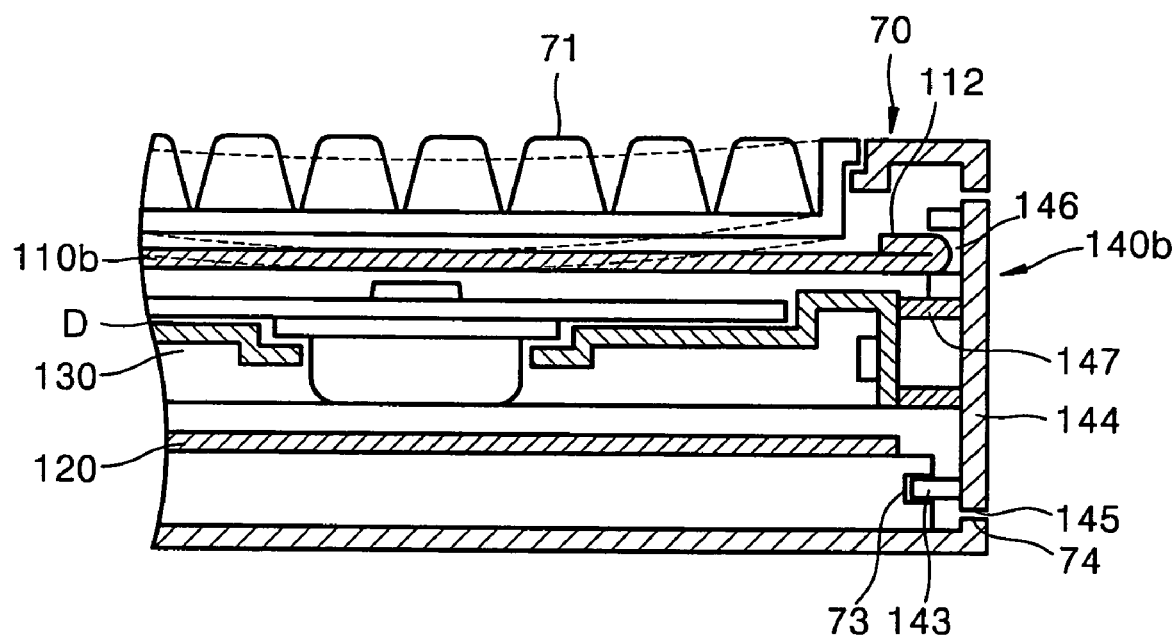
FIG. 7 is a cross-sectional view of the slim optical disc drive of FIG. 6 in a portable computer.
Figure 8:
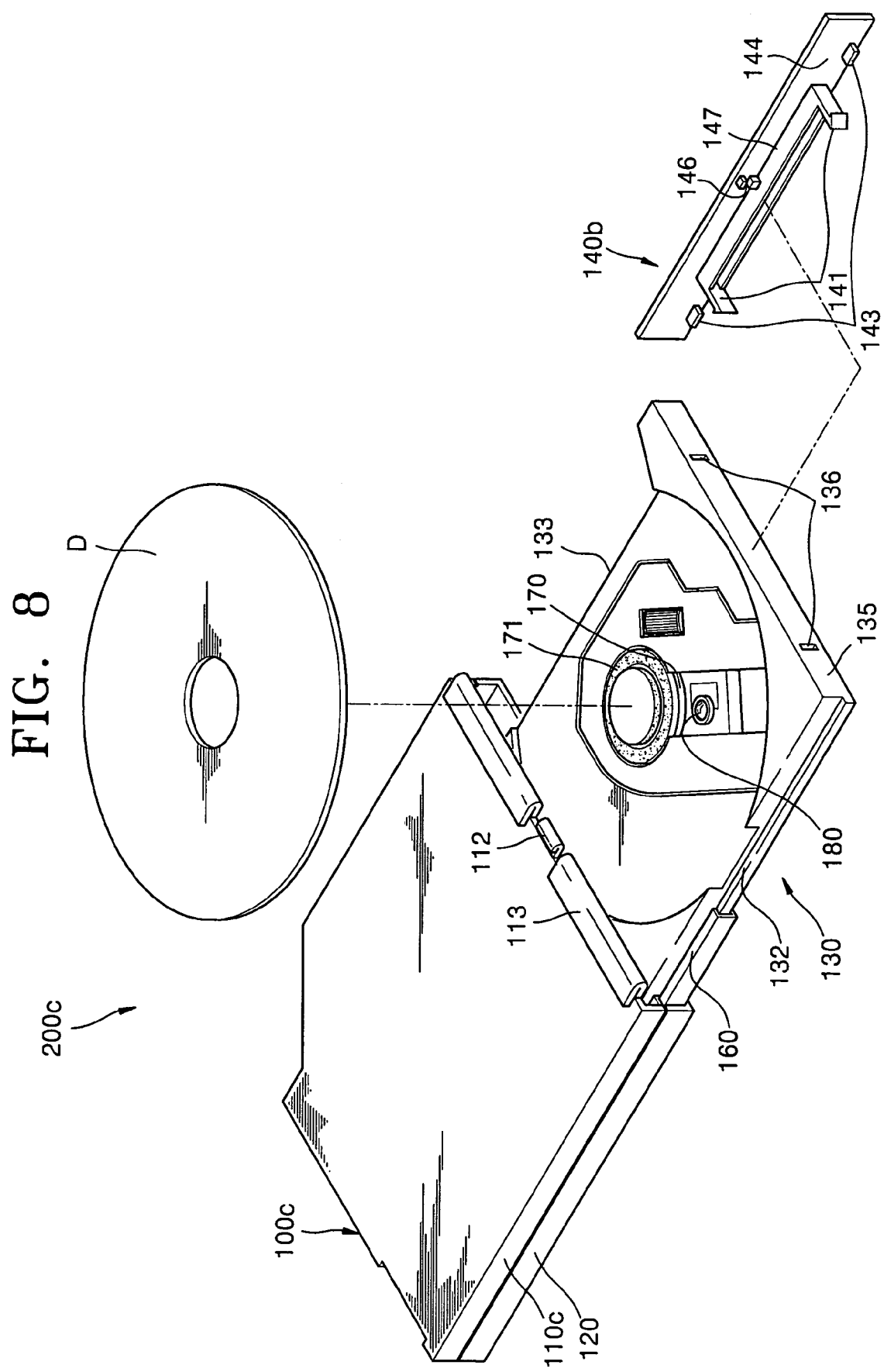
FIG. 8 is an exploded perspective view of a slim optical disc drive according to a third embodiment of the present invention.

FIG. 6 is an exploded perspective view of a slim optical disc drive, according to a second embodiment of the present invention, and FIG. 7 is a cross-sectional view of the slim optical disc drive of FIG. 6 in a portable computer.

In FIGS. 6 and 7, a main body 100b comprises a lower frame 120 and an upper frame 110b. A tray 130 is installed in the main body 100b to be loaded into and/or unloaded from the main body 100b. A front panel 140b is combined with a front side 135 of the tray 130 and comprises an extension 147 extending from a rear surface 144 of the front panel 140b toward the frond side 135. Hooks 141 are formed at both ends of the extension 147 and combined with holes 136 of the front end 135. When the front panel 140b is combined with the tray 130, the extension 147 touches the front side 135.

A protrusion 112 extends from a front end 111 of the upper frame 110b toward the front panel 140b. An insertion portion 146 is formed on the front panel 140b. The protrusion 112 is inserted into the insertion portion 146. In the present embodiment, a protrusion 112 and an insertion portion 146 are formed. However, two or more protrusions 112 and two or more insertion portions 146 may be formed. As shown in FIG. 6, the protrusion 112 is bent in a "U" shape. However, the present invention is not limited to this shape. The same elements of FIG. 6 as those of FIG. 3 will not be described herein.

According to this embodiment, when the tray 130 is loaded into the main body 100b, the protrusion 112 is inserted into the insertion portion 146. Accordingly, the optical disc drive 200b can obtain the same effect as the optical disc drive 200a of FIG. 3.

FIG. 8 is an exploded perspective view of a slim optical disc drive, according to a third embodiment of the present invention. In FIG. 8, a main body 100c comprises a lower frame 120 and an upper frame 110c. A tray 130 is installed in the main body 100c to be loaded into and/or unloaded from. A front panel 140b is combined with a front side 135 of the tray 130. The same elements of FIG. 8 as those of FIGS. 3 and 6 will not be explained herein.

A front end 113 of the upper frame 110c extends longer than the front end 111 of FIG. 3. The front end 113 is bent in a "U" shape. However, the present invention is not limited to this shape. The front panel 140b comprises an insertion portion 146 into which the front end 113 is inserted when the tray 130 is loaded into the main body 100c. When the entire portion of the front end 113 extends, the front end 113 has a higher flexural stress than the front end 111 of FIGS. 3 and 6.

In the present embodiment, an insertion portion 146 is formed on the front panel 140b to support a central portion of the front end 113. However, the present invention is not limited to this configuration. Two or more insertion portions 146 may be formed at a predetermined distance.

According to this embodiment, when the tray 130 slides to be loaded into the main body 100c, the front end 113 is inserted into the insertion portion 146. Accordingly, an optical disc drive 200c can obtain the same effect as the optical disc drives 200a and 200b.

As described above, in an optical disc drive according to the present invention, a front end of an upper frame can be supported by a front panel to prevent the deformation of the upper frame caused by a load. Thus, the optical disc drive is not deformed, and therefore, damage to an optical disc may be prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A slim optical disc drive in a portable computer, comprising:
   a main body comprising an upper frame and a lower frame;
   a tray installed in the main body to be loaded and/or unloaded and comprising a spindle motor to rotate an optical disc and an optical pickup to record information on and/or reproduce information from the optical disc;
   a front panel combined with a front side of the tray;
   at least one protrusion extending from a front end of the upper frame toward the front panel; and an insertion portion formed on the front panel, wherein the at least one protrusion is inserted into the insertion portion, and the front end of the upper frame is supported by the front panel so that the upper frame is prevented from being distorted downwardly by a load.

2. The slim optical disc drive of claim 1, wherein at least a portion of the front panel is support by the portable computer so that the load is conveyed to the portable computer.

3. The slim optical disc drive of claim 1, wherein the front panel comprises a support portion extending toward the front end of the upper frame, the support portion being located under the front end of the upper frame when the tray is loaded into the main body.

4. The slim optical disc drive of claim 1, wherein the front end of the upper frame extends toward the front panel, and the front panel comprises an insertion portion into which the front end is inserted.

5. The portable computer of claim 4, wherein the front end of the upper frame is supported by the front panel to prevent deformation of the upper frame caused by the load.

6. A portable computer, comprising:
- a slim optical disc drive comprising:
  - a main body comprising an upper frame and a lower frame
  - a tray installed in the upper frame and the lower frame to be loaded and unloaded and into the main body and comprising a spindle motor to rotate an optical disc and an optical pickup to record and reproduce information in respect to the optical disc, and
  - a front panel to be combined with a front side of the tray, wherein a front end of the upper frame is supported by the front panel;
- combiners to combine the front panel of the slim optical disc drive to the portable computer; and
- a slot into which the optical disc drive is inserted, wherein when the tray is loaded into the main body, a portion of a lower surface of the front panel is supported by a mouth of the slot.

7. The slim optical disc drive of claim 6, wherein at least a portion of the front panel is supported by the portable computer so that a load is conveyed to the portable computer.

8. The portable computer of claim 6, wherein the upper frame comprises a protrusion which extends from the front end of the upper frame and combines the main body to the front panel.

9. The portable computer of claim 8, wherein the front panel comprises:
- at least one first support portion which supports the front end of the upper frame and extends from a rear surface of the front panel to support the front end when the tray is loaded into the main body;
- second support portions combined with the combiners to combine the front panel to the portable computer;
- an insertion portion to insert the protrusion of the upper frame and combine the front panel with the tray; and
- an extension extending from the rear surface of the front panel and comprising hooks at ends thereof to be inserted into holes of the front end of the tray, wherein the extension contacts with the front side of the tray.

10. The portable computer of claim 9, wherein the second support portions are a complementary shape with respect to the combiners.

11. The portable computer of claim 10, wherein the combiners are dented and the second support portions protrude from the rear surface of the front panel to be inserted into the combiners.

12. The portable computer of claim 10, wherein the second support portions are dented and the combiners protrude from the portable computer to be inserted into the second support portions.

13. The portable computer of claim 6, wherein the front end of the upper frame is supported by the front panel to prevent deformation of the upper frame caused by a load.

* * * * *